United States Patent [19]

Brabb et al.

[11] Patent Number: 4,681,265

[45] Date of Patent: Jul. 21, 1987

[54] SWATH-CONTROLLING VARIABLE CHUTE AND CHUTE-ACTIVATED DAMPER FOR A BROADCAST SPREADER

[75] Inventors: James D. Brabb, London; Dennis L. Simpson, Marysville, both of Ohio

[73] Assignee: White Castle System, Inc., Columbus, Ohio

[21] Appl. No.: 788,874

[22] Filed: Oct. 18, 1985

[51] Int. Cl.⁴ .............................................. A01C 17/00
[52] U.S. Cl. ...................................... 239/665; 239/687
[58] Field of Search ................ 239/665, 666, 687, 685

[56] References Cited

U.S. PATENT DOCUMENTS

| | | | |
|---|---|---|---|
| 2,594,084 | 4/1952 | Skibbe | 239/665 |
| 2,856,191 | 10/1958 | Kolb | 239/665 |
| 3,158,375 | 11/1964 | Vig | 239/665 |
| 3,383,055 | 5/1968 | Speicher | 239/687 |
| 3,394,892 | 7/1968 | Speicher | 239/687 |
| 3,425,636 | 2/1969 | Dreyer | 239/665 |
| 3,817,408 | 6/1974 | Hanson | 239/665 |
| 3,989,194 | 11/1976 | Parker | 239/687 |
| 4,106,703 | 8/1978 | Magda | 239/665 |
| 4,588,133 | 5/1986 | Brabb et al. | 239/687 |

*Primary Examiner*—Andres Kashnikow
*Assistant Examiner*—Michael J. Forman
*Attorney, Agent, or Firm*—Wm. Cates Rambo; William S. Rambo

[57] ABSTRACT

A material-directing chute is slidably mounted on a hopper and is interposed between a discharge port in the hopper and a rotary impeller. The position of the chute is controlled by a handle-mounted lever. By shifting the chute to a relatively advanced position, a peripheral portion of a material-receiving drop area on the impeller is shifted radially inwardly from the peripheral edge of the impeller. Accordingly, a material distribution pattern may be provided which avoids areas such as gardens, shrubbery and driveways on one lateral side of the spreader. In addition, a chute-activated damper is provided to impede the flow of material when the chute is in the relatively advanced position.

1 Claim, 5 Drawing Figures

SWATH-CONTROLLING VARIABLE CHUTE AND CHUTE-ACTIVATED DAMPER FOR A BROADCAST SPREADER

TECHNICAL FIELD

The present invention relates to centrifugal broadcast spreaders for distributing fertilizer, grass seed and other granular, pelletized, particulate or powdered material onto the ground, and more particularly to means for regulating the swath or distribution pattern of the material emanating from the spreader.

BACKGROUND ART

Material flowing from the hopper of a broadcast spreader strikes a rotating impeller or distribution plate positioned therebelow and is distributed by the impeller in a generally fan-shaped, bilaterally symmetrical pattern ahead of the spreader. This relatively expansive distribution pattern permits rapid coverage with a variety of materials ranging in size from powdered forms to pellets. However, since the fertilizer or other material is, in effect, launched from the apparatus, it is sometimes difficult to control the distribution pattern. It is, for instance, difficult to apply a sufficient amount of material to those portions of a lawn that border flower beds, shrubbery, patios and driveways without depositing a substantial amount of material on these outlying areas. This problem is particularly significant where fairly large sized pellets or pearls of fertilizer are being applied. This material is relatively expensive, so the cost of the overspray may be significant. In addition, such pellets contain a substantial amount of material and can damage plant life for which they are unsuitable. Control problems can also arise because substantially different distribution patterns are created by differently sized and weighted particles. Heretofore, if the operator wished to compensate for these changing patterns, the speed and/or course of the spreader over the lawn had to be altered whenever differently sized materials were applied. Accordingly, if it were possible to adjust or modify the distribution pattern of material coming off of the impeller, more uniform applications could be made, and outlying areas could be avoided.

One possibility for controlling the distribution pattern is to provide a deflector that redirects some of the material after it is ejected from the impeller. U.S. Pat. No. 4,511,090 issued Apr. 16, 1985 to Morgan discloses a broadcast spreader provided with a curved deflector that is positioned to block material from reaching beyond one lateral side of the spreader, thereby avoiding outlying gardens, walkways, etc.. While it assists in keeping material within the confines of a yard, the Morgan deflector creates a nonuniform distribution pattern.

Another possibility for controlling the distribution pattern is to change the target area of the impeller that receives material from the hopper. U.S. Pat. No. 4,497,446 issued Feb. 5, 1985 to van der Lely et al discloses a broadcast spreader wherein the drop point or target area on the impeller can be rotated or adjusted annularly. By doing so, the entire distribution pattern is shifted laterally in one direction or the other, depending upon the direction of rotation of the impeller. While the concentration of material in this pattern is substantially uniform, the shift in direction of the entire pattern would tend to throw an excessive amount of material onto areas that were covered before the shift took place.

Departing from the teachings of Morgan and van der Lely et al, the present inventors noted that the distribution pattern could be altered by moving the drop point or target area on the impeller radially inwardly and outwardly. They found that by moving the outer edge of the target area inwardly while keeping the inner edge the same, that a portion of the distribution pattern disposed laterally outwardly from one side of the spreader would be eliminated. The rest of the pattern, however, would remain substantially the same. In this manner, outlying gardens could be avoided without destroying uniformity in the quantity of material being applied from swath to swath.

DISCLOSURE OF THE INVENTION

The present invention represents an improvement in a broadcast spreader that distributes granular or pelletized material and that includes a hopper having a discharge port, a rate-controlling shutter disposed below the discharge port and movable between a closed position and a plurality of open positions relative to the discharge port, and a material-distributing, rotary impeller spaced below the discharge port and shutter. The present invention basically comprises a material-directing, variable-position chute and a control device for selectively shifting the chute between a plurality of positions. The variable chute is slidably mounted on the hopper and is provided with a material-directing web portion movable between positions of more or less interposition between the discharge port and the impeller. At least one of the positions into which the chute can be shifted by the control device causes the impeller to distribute the material in a first distribution pattern, and another of the positions into which the chute can be shifted causes the impeller to distribute the material in a second, somewhat different distribution pattern. Preferably, the first distribution pattern covers a generally fan-shaped area that is wider than the spreader, and the second distribution pattern covers the same area except for a portion extending outwardly beyond one lateral side of the spreader. It is also preferable for the present invention to include a chute-activated damper that is disposed below the discharge port and the shutter to partially obstruct the discharge port when the chute is in a position which causes the second distribution pattern.

A primary object of the present invention is to provide a broadcast spreader that can distribute a variety of materials of different sizes. Another object of the present invention is to provide a means of varying or adjusting the distribution pattern of the spreader while it is in operation. A further object is to provide means for varying the distribution pattern so as to avoid areas on one side or the other of the spreader. Yet another object of the present invention is to automatically reduce the amount of material being spread when the distribution pattern is skewed away from one side or the other of the hopper.

BEST MODE FOR CARRYING OUT THE INVENTION

Figure 1:
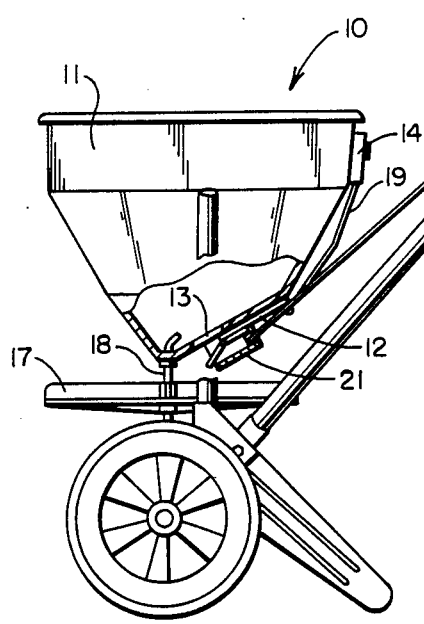
FIG. 1 is a side elevational view of a broadcast spreader with a portion of the outer hopper wall and a lateral support member broken away to reveal a variable chute and a chute-activated damper according to the present invention.

As indicated in FIG. 1, a broadcast spreader, generally designated 10, for distributing pulverized, particulate or pelletized material basically comprises a hopper 11 mounted on a wheeled frame, a shutter or valve plate 12 slidably mounted on the hopper below a discharge port 13 formed therein, an adjustable rate control device 14 that limits the opening movement of the shutter, a handle-mounted, hand-operated lever 15 and a connecting rod or cable 16 for shifting the shutter between opened and closed positions, and a rotary impeller or distribution plate 17 mounted on a drive shaft 18 that extends upwardly into the hopper and downwardly into an axle-mounted gear box (not shown). The rate control device 14 is typically provided with an adjustable cam or stop member (not shown) against which one end of a spring-biased guide rod 19 abuts. The other end of the rod 19 is connected to the shutter 12 and normally urges it toward a closed position.

Figure 2:
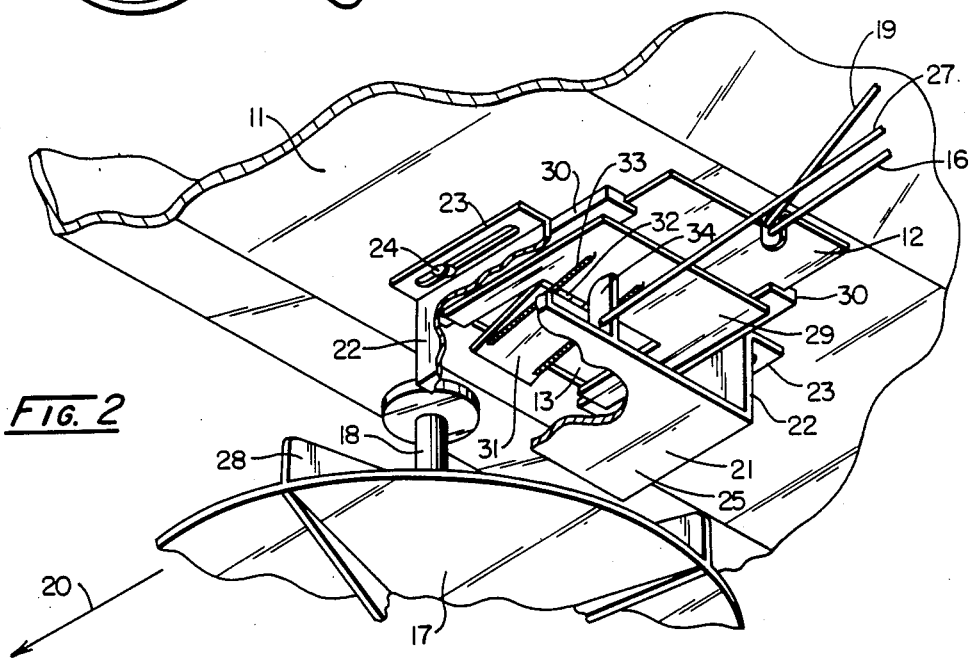
FIG. 2 is an enlarged, fragmentary perspective view of the present chute and damper assembly as seen from below the impeller, with a portion of the chute broken away to reveal a spring-biased valve plate on the damper.
Figure 3:
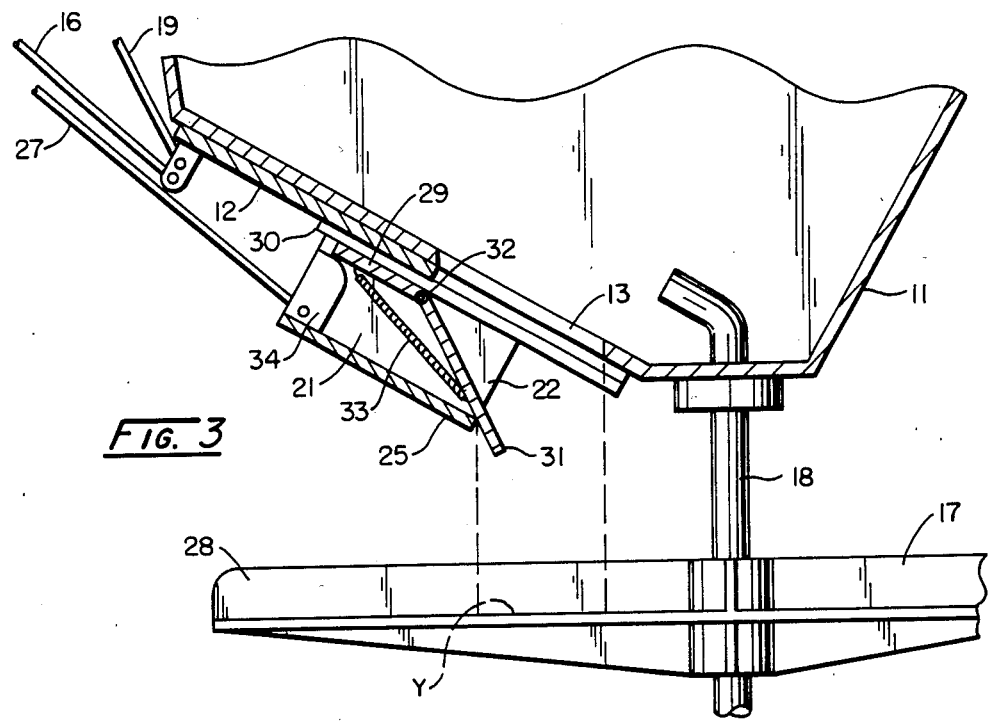
FIG. 3 is a further enlarged fragmentary vertical sectional view taken through the hopper, impeller and the present chute and damper assembly, and particularly illustrates the valve plate of the damper in its open position.
Figure 4:
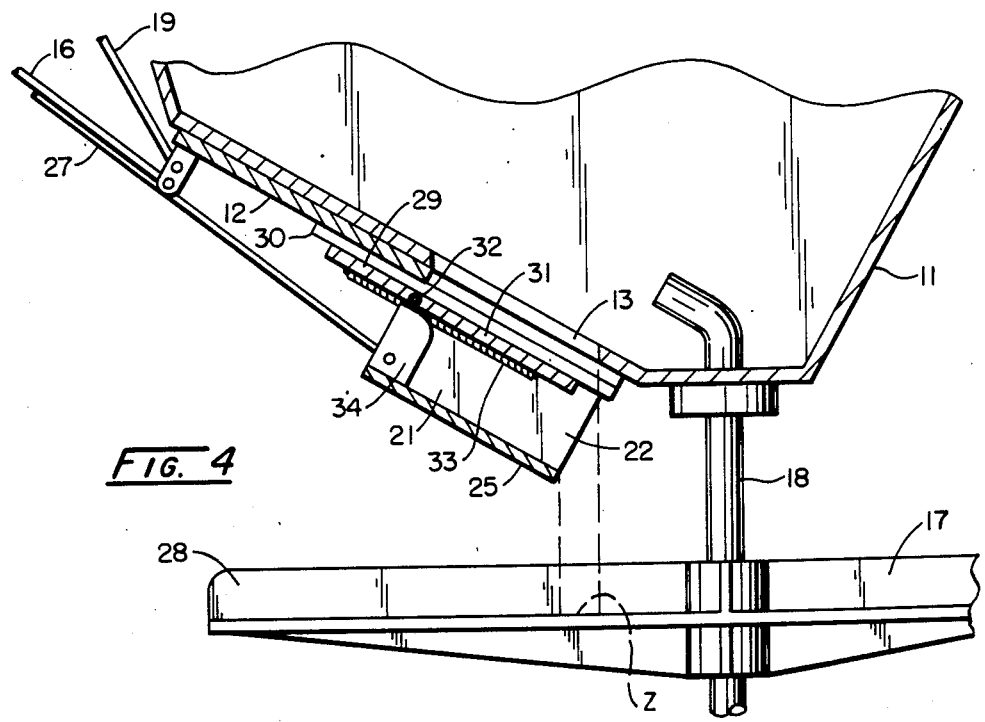
FIG. 4 is a fragmentary vertical sectional view similar to FIG. 3 and particularly illustrates the present valve plate in a closed position.

As indicated in FIGS. 2-4, the discharge port 13 and the impeller 17 are positioned relative to one another so that material flowing from the port will land upon a rear central portion of the impeller at any given instant in time. The discharge port 13 and the impeller 17 are preferably positioned so that they would be bisected by an imaginary vertical center line extending downwardly through the hopper and oriented in the direction of movement of the spreader indicated by the directional vector 20. The impeller drive shaft 18, however, is disposed somewhat more forwardly along the midline than the discharge port 13.

A material-directing, variable-position chute 21 is slidably mounted on the hopper 11 for movement between positions of relatively more or less interposition between the discharge port 13 and the impeller 17. As explained herein, the positional changes of the chute 21 affect the distribution pattern of material ejected from the impeller 17. As best indicated in FIG. 2, the chute 21 is formed with a pair of laterally spaced apart legs 22 disposed on opposite sides of the discharge port 13. Outwardly projecting, generally perpendicular flanges 23 define the ends of the legs 22 and are provided with elongated slots which permit the chute 21 to be slidably mounted on the hopper 11. A guide pin 24 or other fastener extends through each slot and is secured to the hopper 11, thereby holding the chute legs 22 against the hopper while permitting the chute to slide or reciprocate thereon. A material-directing web portion 25 of the chute 21 extends between the legs 22 and is disposed in spaced relation to and between the discharge port 13 and the impeller 17. The position of the chute 21 is controlled by means of a second handle-mounted, hand-operated lever 26 (FIGS. 1 and 5) and a cable or connecting rod 27 that extends between the lever 26 and the chute web 25. In this manner, the chute position can be altered while the spreader is in motion, thereby permitting the operator to observe the distribution pattern as the alterations or adjustments in the chute position are made.

The position of the chute 21 may be varied so that more or less of the material flowing through the discharge port 13 strikes the chute web 25 before reaching the impeller 17. In this manner, the chute 21 is able to enlarge or restrict the drop or target area of the impeller 17 receiving the material. As indicated in FIG. 3, when the chute 21 is in a retracted or less interposed position relative to the discharge port 13 and impeller 17, a relatively large segment Y of said impeller constitutes the drop area. As indicated in FIG. 4, when the chute 21 is in an advanced or more interposed position relative to the discharge port 13, a considerably smaller segment Z of the impeller 17 receives the fertilizer or other material flowing out of the hopper 11. As may be readily understood, there are a number of other factors, such as the material particle size, air turbulence, and surface grade that influence the direction of material falling onto the impeller 17. Hence, the target areas Y and Z of the impeller 17 are only approximate locations of where the material will land, and are particularly illustrative of the relative effects of shifting the chute 21 between retracted (FIG. 3) and advanced (FIG. 4) positions.

Figure 5:
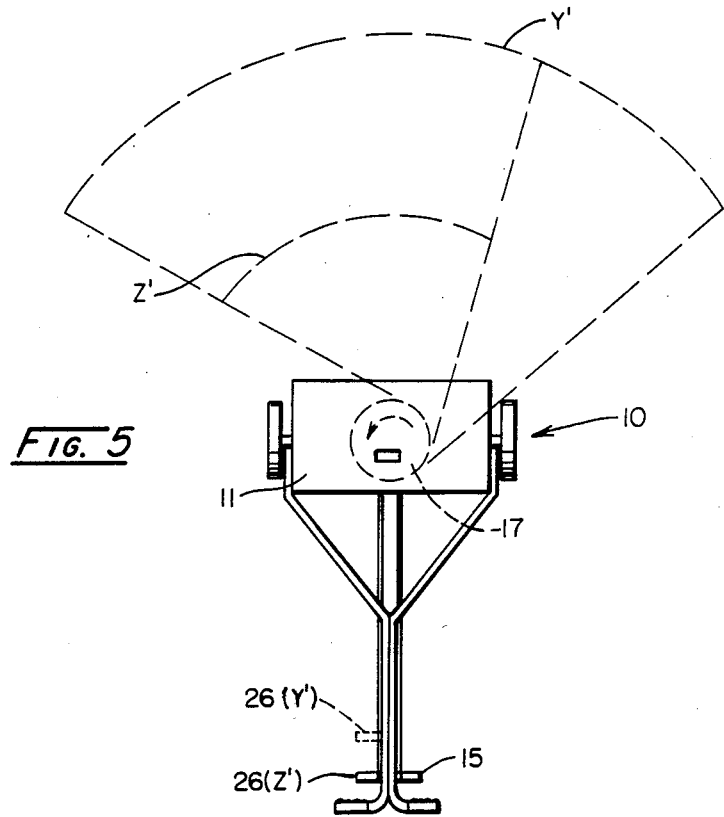
FIG. 5 is a diagramatic view of the distribution patterns which are obtained by shifting the chute between a normal operating mode and a "garden-avoiding" mode.

Somewhat similarly, FIG. 5 illustrates the relative differences in the approximate distribution patterns of material flying off of the impeller 17 when the chute 21 is in the retracted and advanced positions illustrated in FIGS. 3 and 4, respectively, without regard to factors such as air currents, surface grade and particle size. A full distribution pattern Y' is obtained when the chute 21 is retracted and a relatively large drop area Y on the impeller 17 receives material. As can be seen, the full distribution pattern Y' covers a generally fan-shaped area ahead of and wider than the spreader 10. In addition, the full distribution pattern Y' is roughly bilaterally symmetrical with respect to the spreader 10, so that approximately equal areas extending obliquely outwardly beyond each side of the spreader 10 are covered by said full pattern Y'.

In contrast, a relatively smaller distribution pattern Z' is produced when the chute 21 is in a relatively advanced position and a smaller target area Z of the impeller 17 receives material. The restricted distribution pattern Z' covers roughly the same area as the full distribution pattern Y', except for a portion extending obliquely beyond one lateral side of the spreader 10. The lateral portion of the full distribution pattern Y' which is eliminated by moving the chute 21 forwardly to a position of greater interposition depends upon the direction of rotation of the impeller 17. If, as illustrated in FIG. 5, the impeller 17 rotates in counterclockwise fashion, a portion of the full pattern Y' disposed obliquely outwardly from the right lateral side of the spreader, as viewed from behind the device, will be missing from the restricted pattern Z'. Were the impeller 17 to rotate in clockwise fashion, a portion of the full pattern Y' disposed obliquely outwardly from the left lateral side of the spreader would be eliminated in the restricted distribution pattern.

The above-described differences in the distribution patterns Y' and Z' are believed to occur for the following reasons. The material moves outwardly on the rotating impeller 17 in a relatively random, curved pattern until it reaches an upwardly projecting vane 28, whereupon it tends to proceed outwardly along the impeller in a relatively thin stream. When a particle of material reaches the end of the impeller 17, it is launched outwardly in a direction roughly tangential to its instantaneous position on the perimeter of the impeller. The next particle of material reaches the end of the impeller 17 only an instant later, but in this fraction of a second, the impeller has moved sufficiently to send the second particle off on a slightly different tangent from the first. This progression continues until the entire stream of material on a given vane 28 is ejected, whereupon sufficient time has elapsed for material to have gathered along the following vane, for the first particles on said following vane to have reached the perimeter, and for said following vane to be positioned to launch the material in substantially the same distribution pattern as the first stream.

If the operator pushes the spreader 10 over the ground at a substantially constant speed, then the rotational velocity of the impeller 17 will be substantially constant. If the velocity of the impeller 17 is held constant, then a change in the distance between the drop area and the perimeter of the impeller will change the time it takes the material to reach the perimeter. As previously indicated, particles of material reaching the perimeter at different times will fly off the impeller 17 in different directions. Thus, the direction that a given particle will take when it is ejected from the impeller will change if the distance between its drop point and the perimeter of the impeller is changed.

As indicated in FIGS. 3 and 4, movement of the chute 21 to a position of greater interposition between the discharge port 13 and the impeller 17 increases the distance between the perimeter of the impeller and the outer boundary of the drop area, while the inner boundary of the drop area remains constant. In effect, the forward movement of the chute 21 increases the time it takes the leading particles of material to reach the perimeter of the impeller 17. Hence, an initial portion of the full distribution pattern Y′, which is established by the material deposited relatively closer to the perimeter of the impeller in drop area Y, is eliminated as the chute 21 is shifted forwardly. However, since the distance between the innermost portion of the target areas Y and Z and the perimeter of the impeller 17 remains constant, a tail portion of the full distribution pattern Y′ is not altered when the chute 21 is shifted forwardly.

There are two reasons why it is advantageous to be able to adjust the drop area on the impeller 17. First, if a relatively restricted drop area Z illustrated in FIG. 4 can be obtained, then areas disposed outwardly from one lateral side of the spreader 10 may be avoided. As indicated in FIG. 5, a relatively restricted distribution pattern Z′ is obtained when the drop area on the impeller 17 is properly confined. Thus, if the impeller 17 is geared to rotate in counterclockwise fashion, flower beds, shrubbery, driveways and the like disposed to the right of the spreader 10 may be avoided. The second advantage of having a variable-position chute 21 that adjusts the size of the drop area is its ability to regulate and adjust the distribution pattern of differently sized materials. It has been found that materials differing substantially in mean particle size have substantially different distribution patterns on spreaders provided with a fixed impeller target area. For instance, if fertilizers that are formed into relatively large pellets are used in a broadcast spreader that works well with smaller-granuled materials, the distribution pattern for the larger pellets will be skewed radically.

When the impeller 17 rotates at a substantially constant velocity, it exerts a substantially constant force on the particles of material. If the force exerted on the particles remains substantially constant but the average size or mass of the particles changes, then the acceleration of the particles toward the periphery of the impeller 17 must change. Further, if the distance between the drop point and the end of the impeller 17 remains constant, then the time it takes to travel that distance must change in order to accomplish a change in acceleration. Accordingly, given a constant force exerted on the particles by the impeller 17, particles of relatively small mass will travel between a fixed drop point and the perimeter of the impeller faster than particles of relatively large mass. As previously indicated, the direction a particle takes when it is ejected from the impeller 17 depends upon the time it takes the particle to reach the perimeter of the impeller. In the present invention, the difference between the time it takes a small particle to travel from drop point to perimeter and the time it takes a large particle to do so may be reduced or eliminated by varying the position of the present chute 21. For instance, by retracting the chute 21, the distance between the drop point for some of the material and the perimeter of the impeller 17 is shortened, and the time it takes this material to reach the end of the impeller 17 is reduced. Accordingly, by retracting the chute 21 when materials of larger particle size are employed, the direction the larger particles take when they are ejected from the impeller will more closely resemble the distribution pattern of relatively smaller particles.

The inclusion of a handle-mounted, hand-operated control lever 26 and associated connector 27 for adjusting the position of the chute 21 is particularly advantageous when the operator is trying to adjust the distribution pattern. This semi-remote control assembly 26-7 permits the operator to change the distribution pattern while the spreader is in operation, thereby providing substantially instantaneous changes in the distribution pattern as the position of the chute 21 is adjusted.

The flow rate of material passing through the discharge port 13 is regulated primarily by the shutter 12, the rate control device 14 and the rate control lever 15. However, when the chute 21 is in a relatively advanced position, as illustrated in FIG. 4, the flow of material through the discharge port 13 is further restricted by means of a chute-activated damper 29. Preferably the damper 29 is a plate-like structure that extends between the chute legs 22 and that is mounted on the outer surface of a pair of guide rails 30 through which the shutter 12 slides. The damper 29 is formed with a generally U-shaped base portion, the open end of which is centered below the discharge port 13, and with a valve plate 31 pivotally attached to the open end of the damper base by means of a hinge 32 or other flexible connector. The valve plate 31 is biased to an opened position relative to the discharge port 13 by a pair of coil springs 33. As best indicated in FIG. 2, the valve plate 31 preferably occupies approximately one-half of the open end of the damper base and is capable of restricting the flow of material through approximately one-half of the discharge port 13.

The damper 29 is activated by the chute 21 in the following manner. A flange or cam 34 to which the chute control rod 27 is attached projects upwardly from the chute web 25 in alignment with the valve plate 31. As indicated in FIG. 4, the flange 34 projects from the chute web 25 a sufficient distance for its rounded upper surface to engage the valve plate 31. However, since the flange 34 is positioned on the rear edge of the chute web 25, it will not engage the valve plate 31 unless the chute is in a relatively advanced position. As indicated in FIG. 3, since the cam 34 does not engage the valve plate 31 when the chute 21 is in a relatively retracted position, the springs 33 urge the valve plate 31 away from the discharge port 13. When the valve plate 31 is engaged by the flange 34, it is pushed into a position where it is coplanar with the base portion of the damper 29. In this position, the valve plate 31 partially obstructs the discharge port 13, thereby reducing the flow of material therethrough.

Preferably, the valve plate 31 is activated and the flow of material from the discharge port 13 is reduced only when the chute 21 is in such an advanced position that it will cause the distribution pattern to avoid an area on one lateral side of the spreader. As may be readily understood, it is advantageous to distribute uniform amounts of material in all areas. Absent the damper 29, the same amount of material would be dispensed in both the full Y' and reduced Z' distribution patterns. Since the reduced pattern Z' covers a substantially smaller area than the full pattern Y', the amount of material deposited in the restricted area would be substantially greater than the amount deposited in the full area. This excess could harm the grass or soil and, in any case, frustrate the objective of providing uniform amounts of material throughout the yard. By reducing the flow of material out of the discharge port 13 when the chute 21 is in a sufficiently advanced position to create a restricted distribution pattern Z', the damper 29 prevents an excessive amount of material from being distributed.

Operation of the present broadcast spreader 10 is much like the operation of a conventional broadcast spreader. At the outset, the shutter 12 is closed by shifting the handle-mounted lever 15 to a closed position. Next, the rate control mechanism 14 is adjusted for the type of material which will be employed. The hopper 11 is then filled with the desired fertilizer, grass seed or the like. In order to plot a course over the lawn or other surface, the operator must know the direction of rotation of the impeller 17. This knowledge can be obtained by simply observing the impeller 17 as the broadcast spreader moves along the ground. If its rotation is counterclockwise, as indicated in FIG. 5, then the operator positions the spreader so that the flower beds, shrubs and driveways, etc. that are to be avoided lie to the right of the spreader, as viewed from the rear. Once the course has been determined, the spreader is positioned at a convenient starting point along the border of the area to be covered. The chute-controlling lever 25 is then shifted so that the chute 21 is in a sufficiently advanced position to cause the restricted distribution pattern Z'. The spreader 10 is then set in motion and the shutter 12 is opened by the shutter control lever 15. Once the border area has been covered, the chute 21 is shifted to the full distribution pattern Y'. The proper position of the chute 21 is best established by making relatively minor positional adjustments with the chute-controlling lever 25 as the spreader is pushed along the preselected course. Once the desired chute position is established, operation of the spreader can continue in a conventional manner well known in the art.

Thus it may be seen that a broadcast spreader provided with a variable chute and a chute-activated damper according to the present invention permits the operator to control the distribution pattern of the material being spread and hence, to maintain a generally uniform distribution pattern, no matter what material is being employed. In addition, the present invention allows the distribution pattern to be restricted so as to avoid gardens, shrubbery, driveways, etc., that border the material-receiving area.

While a single preferred embodiment of the present invention has been described and illustrated in some detail, various modifications and refinements may be made without departing from the essence of the invention or the scope of the following claims.

We claim:

1. In a broadcast spreader for distributing granular or pelletized material and including a hopper having a discharge port, a shutter disposed below the discharge port and movable between a closed position and a plurality of open positions relative to said discharge port, shutter control means for selectively shifting the shutter between said closed and open positions, and a rotary impeller spaced below said shutter for receiving material passing from the hopper through the discharge port and for casting said material outwardly from the spreader in a generally fan-shaped distribution pattern, that improvement which comprises:
    (a) a nonrotating material-directing chute slidably and externally disposed relative to the hopper for linear movement between a plurality of chute positions ranging from relatively greatest to least interposition between the discharge port and the impeller, said chute being variably disposed between the discharge port and the impeller so as to direct material onto a variable area of the impeller, at least one of said chute positions causing said impeller to distribute the material in a first distribution pattern and another of said chute positions causing a second distribution pattern;
    (b) chute control means for selectively shifting said chute between said chute positions during operation of said spreader and independently of the shutter control means;
    (c) a material-receiving drop area on the rotary impeller, said drop area having a generally fixed radially inner boundary and a varibale radially outer boundary whose position on said rotary impeller is determined by said chute position;
    (d) a damper disposed between the shutter and said chute and provided with a valve plate that is movable between relatively closed and opened conditions, said valve plate providing in the relatively closed condition a greater obstruction to the flow of material from the discharge port to the chute than in the relatively opened condition; and
    (e) means provided on the chute for engaging the valve plate and urging it into the relatively closed condition as said chute reaches the position of greatest interposition between the discharge port and the impeller.

* * * * *